(No Model.)

A. C. FRANKEL.
CASTER.

No. 350,302. Patented Oct. 5, 1886.

WITNESSES,
James P. DuHamel
Walter S. Dodge

Alexander C. Frankel,
INVENTOR,
by Dodge & Son,
Attorneys.

UNITED STATES PATENT OFFICE.

ALEXANDER C. FRANKEL, OF NEWARK, NEW JERSEY, ASSIGNOR TO JACOB LAGOWITZ, OF SAME PLACE.

CASTER.

SPECIFICATION forming part of Letters Patent No. 350,302, dated October 5, 1886.

Application filed January 23, 1886. Serial No. 189,458. (No model.)

*To all whom it may concern:*

Be it known that I, ALEXANDER C. FRANKEL, of Newark, in the county of Essex and State of New Jersey, have invented certain new and useful Improvements in Casters, of which the following is a specification.

My invention relates to casters, designed more particularly for trunks and similar articles, and has for its object to simplify and cheapen the construction, due regard being had to strength and durability.

Figure 1:
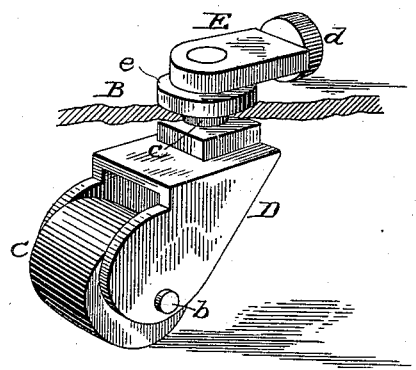
Figure 2:
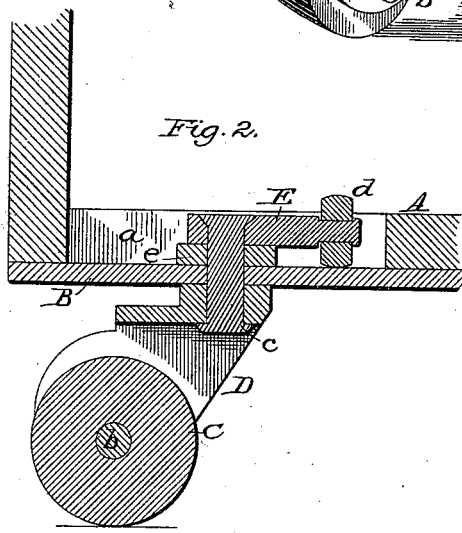

In the drawings, Figure 1 is a perspective view of my improved caster; Fig. 2, a vertical section of the same at right angles to the angles to the axis of the main roller, and Fig. 3 a view illustrating a slight modification.

The invention consists in providing the caster proper with a friction roller bearing upon the upper side of the plate in which the caster is swiveled, the friction-roller being attached to an arm formed upon or secured rigidly to the caster shank or spindle, so as to occupy a fixed position relatively thereto and move therewith, the point of bearing of the friction-roller being preferably the same distance in advance of the caster pivot or swivel as the point of bearing of the main roller is in rear of the same.

A indicates a box or trunk provided with a recess or socket, *a*, over which is placed a plate, B, the latter being secured in place by screws or otherwise.

C indicates the main roller, mounted on an axle, *b*, carried by a sheath or casing, D, the latter being provided with the pivot shank or stem *c*, as clearly shown in Fig. 2. The stem or shank *c* is cast with or riveted or otherwise secured to the sheath or casing C, and extends upward through a perforation in the plate B, where it is provided with a radial arm, E. This arm E is rigidly secured to the stem or shank *c*, and carries at its outer end a small wheel or roller, *d*, the axis of which is at right angles to the axis *b* of roll C, the axis of roller *d* being advisably situated as far to one side of pivot-bolt *c* as the axis of roller C is to the other side. Washer *e* is interposed between the plate B and the arm E and sheath D, as clearly shown in Fig. 2.

The sheath or casing D may be made of cast metal and the stem or shank *c* formed integral therewith, the arm E being riveted or otherwise secured thereto; or the arm E and the stem or shank *c* may be cast integral and the sheath or casing riveted thereto.

My caster is exceedingly simple and cheap in construction, and by the peculiar arrangement of the arm E the strain is taken off the stem or shank, and there is less liability of breakage. The roller, being above the plate, is protected from dust, dirt, and injury, and has always a smooth and clean surface to work upon, which is not the case with rollers placed beneath the plate.

Figure 3:
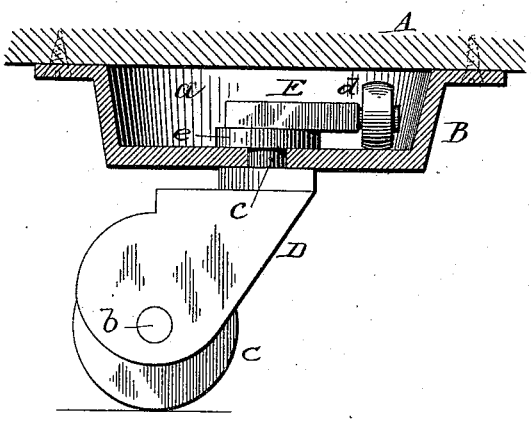

As shown in Fig. 3, the plate B may be cast so as to contain the socket *a*, instead of making the socket in the trunk or other articles and applying the plate thereto. I consider this the equivalent of the construction shown in Figs. 1 and 2, and in some cases deem it preferable, particularly where the casters are to be applied after the trunk or other article is made or sold.

I do not claim, broadly, in a caster, the combination, with a plate to which said caster is pivoted, of an arm projecting from said caster and an anti-friction roller secured to the end of said arm and bearing upon the upper face of the plate.

Having thus described my invention, what I claim is—

1. In combination with a trunk or box, A, a socket, *a*, therein, a perforated plate covering said socket, a caster having its shank or stem extending upward through the plate, an arm projecting radially from said shank or stem, and a roller carried by said arm and bearing upon the upper face of plate B.

2. The herein-described caster, consisting of plate B, shank *c*, extending through said plate, sheath or casing D, carried by said shank below plate B, arm E, carried by said shank above the plate, and roller *d*, mounted loosely upon said arm and adapted to bear upon the upper face of the plate.

ALEXANDER C. FRANKEL.

Witnesses:
F. P. STUBARBORETT,
FRED. W. HEILMAN.